(12) United States Patent
Maldonado et al.

(10) Patent No.: US 7,974,317 B2
(45) Date of Patent: Jul. 5, 2011

(54) SYSTEMS AND METHODS FOR CONTROLLING THE VOLTAGE OF SIGNALS USED TO CONTROL POWER AMPLIFIERS

(75) Inventors: David Maldonado, Chula Vista, CA (US); Puay Hoe See, San Diego, CA (US); Bo Sun, Carlsbad, CA (US); Guang Zhang, San Diego, CA (US); Brett C. Walker, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 616 days.

(21) Appl. No.: 12/133,758

(22) Filed: Jun. 5, 2008

(65) Prior Publication Data

US 2009/0161588 A1 Jun. 25, 2009

Related U.S. Application Data

(60) Provisional application No. 61/015,654, filed on Dec. 20, 2007.

(51) Int. Cl.
*H04J 3/04* (2006.01)
(52) U.S. Cl. ........................................ 370/535; 370/537
(58) Field of Classification Search .................. 370/532, 370/533, 534, 535, 536, 537
See application file for complete search history.

(56) References Cited

U.S. PATENT DOCUMENTS

| | | | |
|---|---|---|---|
| 5,463,487 A * | 10/1995 | Epworth | ......................... 398/79 |
| 7,058,383 B2 | 6/2006 | Sugar et al. | |
| 7,269,357 B2 | 9/2007 | Case et al. | |
| 7,356,262 B2 | 4/2008 | Giaretta et al. | |
| 7,421,255 B2 | 9/2008 | Inamori et al. | |
| 2005/0207754 A1* | 9/2005 | Yamaguchi et al. | ............ 398/38 |
| 2006/0035667 A1 | 2/2006 | Kim | |

FOREIGN PATENT DOCUMENTS

| | | |
|---|---|---|
| DE | 19904376 | 8/2000 |
| EP | 1727136 A2 | 11/2006 |
| WO | WO2007109776 | 9/2007 |

OTHER PUBLICATIONS

International Search Report & Written Opinion—PCT/US2008/087548, International Search Authority—European Patent Office—May 6, 2009.

Jongsun Kim et al: "Design of an Interconnect Architecture and Signaling Technology for Parallelism in Communication" IEEE Transactions on Very Large Scale.

Integration (VLSI) Systems, IEEE Service Center, Piscataway, NJ, US, vol. 15, No. 8, Aug. 1, 2007, pp. 881-894, XP011187729 ISSN: 1063-8210 the whole document.

\* cited by examiner

*Primary Examiner* — Brenda Pham
(74) *Attorney, Agent, or Firm* — Larry Moskowitz

(57) ABSTRACT

A method for controlling the voltage of signals used to control power amplifiers is described. A first multiplexer and a second multiplexer are set to an enabling signal. The first multiplexer is on a first integrated circuit and the second multiplexer is on a second integrated circuit. A command is written to the first multiplexer to set the first multiplexer to one of a plurality of control signals used to control a power amplifier. A command is written to the second multiplexer to select one of the plurality of control signals that maps to the first multiplexer. The second integrated circuit is connected to a power supply.

33 Claims, 9 Drawing Sheets

SYSTEMS AND METHODS FOR CONTROLLING THE VOLTAGE OF SIGNALS USED TO CONTROL POWER AMPLIFIERS

PRIORITY

This application is related to and claims priority from U.S. Provisional Patent Application Ser. No. 61/015,654 filed Dec. 20, 2007, for SYSTEMS AND METHODS FOR CONFIGURING MULTIPLE MULTIPLEXERS VIA AN EXTERNAL INTEGRATED CIRCUIT, with inventors David Maldonado, Puay Hoe See, Bo Sun and Guang Zhang, which is incorporated herein by reference.

TECHNICAL FIELD

The present systems and methods relate to communication and wireless-related technologies. In particular, the present systems and methods relate to systems and methods for controlling the voltage of signals used to control power amplifiers.

BACKGROUND

Wireless communication devices have become smaller and more powerful in order to meet consumer needs and to improve portability and convenience. Consumers have become dependent upon wireless communication devices such as cellular telephones, personal digital assistants (PDAs), laptop computers, and the like. Consumers have come to expect reliable service, expanded areas of coverage, and increased functionality. Wireless communication devices may be referred to as mobile stations, stations, access terminals, user terminals, terminals, subscriber units, user equipment, etc.

A wireless communication system may simultaneously support communication for multiple wireless communication devices. A wireless communication device may communicate with one or more base stations (which may alternatively be referred to as access points, Node Bs, etc.) via transmissions on the uplink and the downlink. The uplink (or reverse link) refers to the communication link from the wireless communication devices to the base stations, and the downlink (or forward link) refers to the communication link from the base stations to the wireless communication devices.

Wireless communication systems may be multiple-access systems capable of supporting communication with multiple users by sharing the available system resources (e.g., bandwidth and transmit power). Examples of such multiple-access systems include Code Division Multiple Access (CDMA) systems, Wideband Code Division Multiple Access (WCDMA), Time Division Multiple Access (TDMA) systems, Global System for Mobile Communications (GSM), Frequency Division Multiple Access (FDMA) systems, and Orthogonal Frequency Division Multiple Access (OFDMA) systems.

Control signals may be used in some or all of these communication systems. Higher voltages and power are needed to drive these control signals as the complexity of the systems increase. However, the circuits included in the communication devices continue to decrease. As the geometry of the circuits decrease, the difficulty in driving control signals with a higher voltage increases. As such, benefits may be realized by providing systems and methods for controlling the voltage of signals used to control power amplifiers.

DETAILED DESCRIPTION

Figure 1:
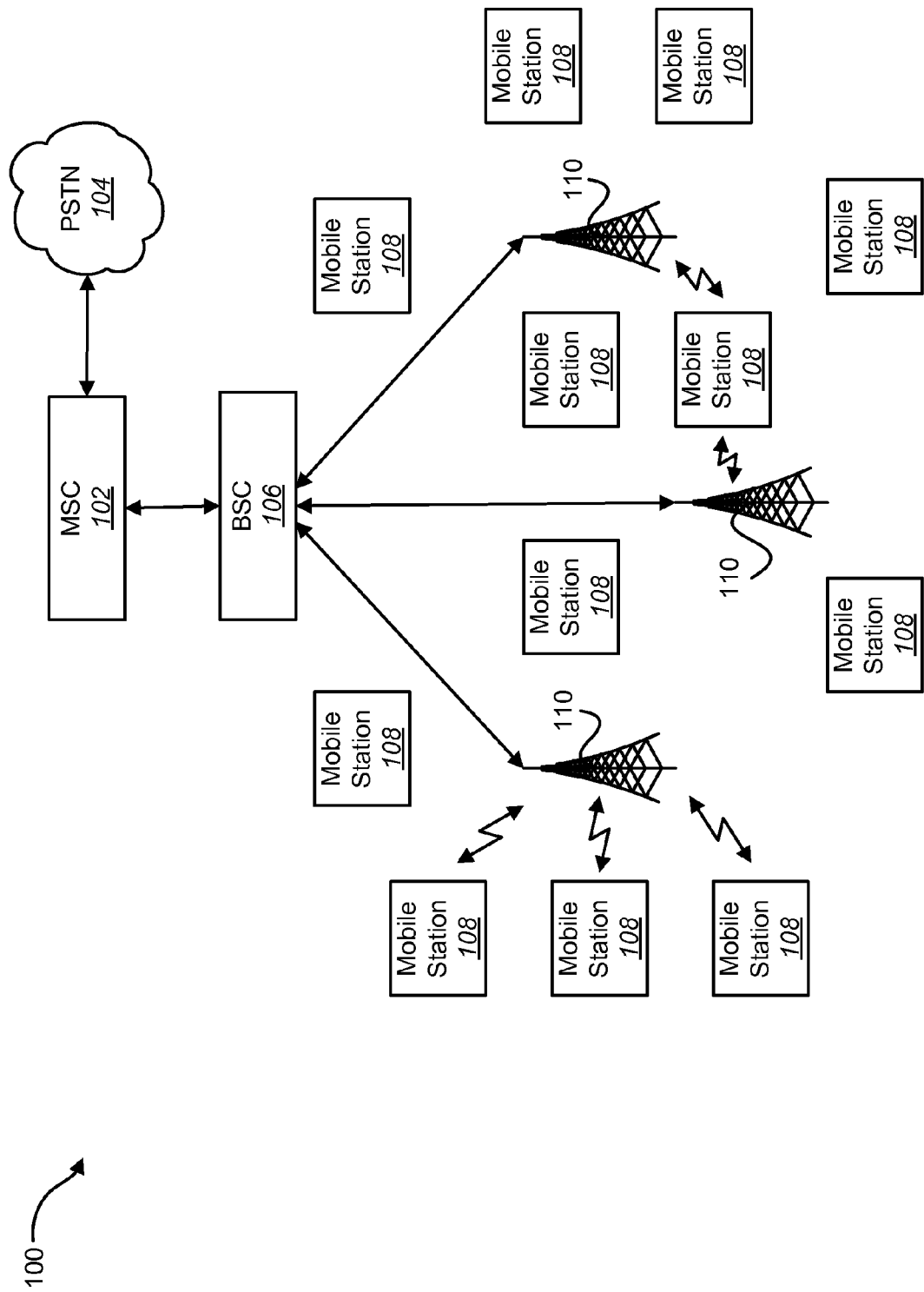
FIG. 1 illustrates an example of a Code Division Multiple Access (CDMA) wireless telephone system.

A method for controlling the voltage of signals used to control power amplifiers is described. A first multiplexer and a second multiplexer are set to an enabling signal. The first multiplexer is on a first integrated circuit, and the second multiplexer is on a second integrated circuit. A command is written to the first multiplexer to set the first multiplexer to one of a plurality of control signals used to control a power amplifier. A command is written to the second multiplexer to select one of the plurality of control signals that maps to the first multiplexer. The second integrated circuit is connected to a power supply.

A wireless device for controlling the voltage of signals used to control power amplifiers is also described. The device includes a processor and memory in electronic communication with the processor. Instructions are stored in the memory. The instructions are executable to set a first multiplexer and a second multiplexer to an enabling signal. The first multiplexer is on a first integrated circuit, and the second multiplexer is on a second integrated circuit. A command is written to the first multiplexer to set the first multiplexer to one of a plurality of control signals used to control a power amplifier. A command is written to the second multiplexer to select one of the plurality of control signals that maps to the first multiplexer. The second integrated circuit is connected to a power supply.

An apparatus for controlling the voltage of signals used to control power amplifiers is also described. The apparatus includes means for setting a first multiplexer and a second multiplexer to an enabling signal. The first multiplexer is on a first integrated circuit, and the second multiplexer is on a second integrated circuit. The apparatus also includes means for writing a command to the first multiplexer to set the first multiplexer to one of a plurality of control signals used to control a power amplifier. The apparatus further includes means for writing a command to the second multiplexer to select one of the plurality of control signals that maps to the first multiplexer. The second integrated circuit is connected to a power supply.

A computer-program product for controlling the voltage of signals used to control power amplifiers is described. The computer-program product includes a computer readable medium having instructions thereon. The instructions include code for setting a first multiplexer and a second multiplexer to an enabling signal. The first multiplexer is on a first integrated circuit, and the second multiplexer is on a second integrated circuit. The instructions also include code for writing a command to the first multiplexer to set the first multiplexer to one of a plurality of control signals used to control a power amplifier. The instructions further include code for writing a command to the second multiplexer to select one of the plurality of control signals that maps to the first multiplexer. The second integrated circuit is connected to a power supply.

A circuit for controlling the voltage of signals used to control power amplifiers is also described. The circuit includes a first integrated circuit and a second integrated circuit. The first integrated circuit is a modem system modem (MSM) circuit, the second integrated circuit is a power management integrated circuit (PMIC) and the second integrated circuit is connected to a power supply. The circuit also includes a first multiplexer on the MSM and a second multiplexer on the PMIC. The first multiplexer and the second multiplexer are set to an enabling signal. A command is written to the first multiplexer to set the first multiplexer to one of a plurality of control signals used to control a power amplifier. The circuit further includes a single-wire serial bus interface (SSBI). The SSBI writes a command to the second multiplexer to select one of the plurality of control signals that maps to the first multiplexer.

The present systems and methods drive higher voltage power amplifier (PA) control signals in communication systems such as a Global System for Mobile Communications (GSM) system and/or a Wideband Code Division Multiple Access (WCDMA) system. The core voltage of a mobile system modem (MSM) digital chip on an integrated circuit (IC) is dropping as the geometry of the circuit shrinks. Accordingly, it may not be possible to drive a voltage from the MSM that is larger than 1.2V. In one configuration, an external integrated circuit (IC), such as a power management IC (PMIC), may be implemented to increase the voltage that may be driven from the MSM for the control signals. The IC may have a single muxed line and a serial bus interface (SBI) that facilitates a larger voltage to be driven to one or more PAs from the MSM via the PMIC.

Power amplifiers may be controlled by a control signal, such as a power amplifier on (PA_ON) signal. Multiplexers (MUXes) may be implemented to combine PA_ON signals from various communication systems (e.g., GSM, WCDMA, CDMA, etc.) into one signal. The implementation of PA_ON MUXes to connect an MSM to a PMIC may reduce the amount of die-to-die connections (also referred to as bumps) between the MSM MUX and the PMIC MUX. For example, 8 bumps may be saved by implementing PA_ON MUXes on the MSM and the PMIC. In another example, the MSM MUX may be external to the PMIC MUX. In other words, the connection between the MSM MUX and the PMIC MUX may be a pin-to-pin connection (instead of a die-to-die connection). The MUX implemented on the MSM may be referred to as an MSM MUX. The MUX on the PMIC may be referred to as a PMIC MUX.

The use of the MUX configuration described above may be extended for a temperature compensated crystal oscillator enabling (TCXO_EN) line, to save two additional bumps. In another example, the MSM MUX may be external to the PMIC MUX. As such, the number of pin-to-pin connections between the MSM MUX and the PMIC MUX may be reduced. In one example, two pin-to-pin connections may be saved if the MSM MUX is external to the PMIC MUX. In one configuration, the TCXO_EN line does not conflict with the use of the PA_ON signals from various communication systems, such as GSM or WCDMA.

In one configuration, both the MSM MUX and PMIC MUX default to the logic state of the TCXO_EN line. This facilitates the PMIC to respond to the TCXO_EN first because no transmission occurs without the TCXO_EN or the PMIC being on. In one example, after the PMIC has warmed up, an SBI command sets the MSM MUX and the PMIC MUX to any of the PA_ON signals that the MSM may be using. When the PMIC goes to sleep, an SBI command may be sent to the PMIC at the ordinary time when the TCXO_EN normally goes low.

FIG. 1 illustrates a wireless telephone system 100 that may include a plurality of mobile stations 108, a plurality of base stations 110, a base station controller (BSC) 106 and a mobile switching center (MSC) 102. The MSC 102 may be configured to interface with a public switch telephone network (PSTN) 104. The MSC 102 may also be configured to interface with the BSC 106. There may be more than one BSC 106 in the system 100.

Each base station 110 may include at least one sector (not shown), where each sector may have an omnidirectional antenna or an antenna pointed in a particular direction radially away from the base stations 110. Alternatively, each sector may include two antennas for diversity reception. Each base station 110 may be designed to support a plurality of frequency assignments. The intersection of a sector and a frequency assignment may be referred to as a Code Division Multiple Access (CDMA) channel. The mobile stations 108 may include cellular or portable communication system (PCS) telephones.

During operation of the wireless telephone system 100, the base stations 110 may receive sets of reverse link signals from sets of mobile stations 108. The mobile stations 108 may be conducting telephone calls or other communications. Each reverse link signal received by a given base station 110 may be processed within that base station 110. The resulting data may be forwarded to the BSC 106. The BSC 106 may provide call resource allocation and mobility management functionality including the orchestration of soft handoffs between base stations 110. The BSC 106 may also route the received data to the MSC 102, which provides additional routing services for interface with the PSTN 104. Similarly, the PSTN 104 may interface with the MSC 102, and the MSC 102 may interface with the BSC 106, which in turn may control the base stations 110 to transmit sets of forward link signals to sets of mobile stations 108.

Figure 2:
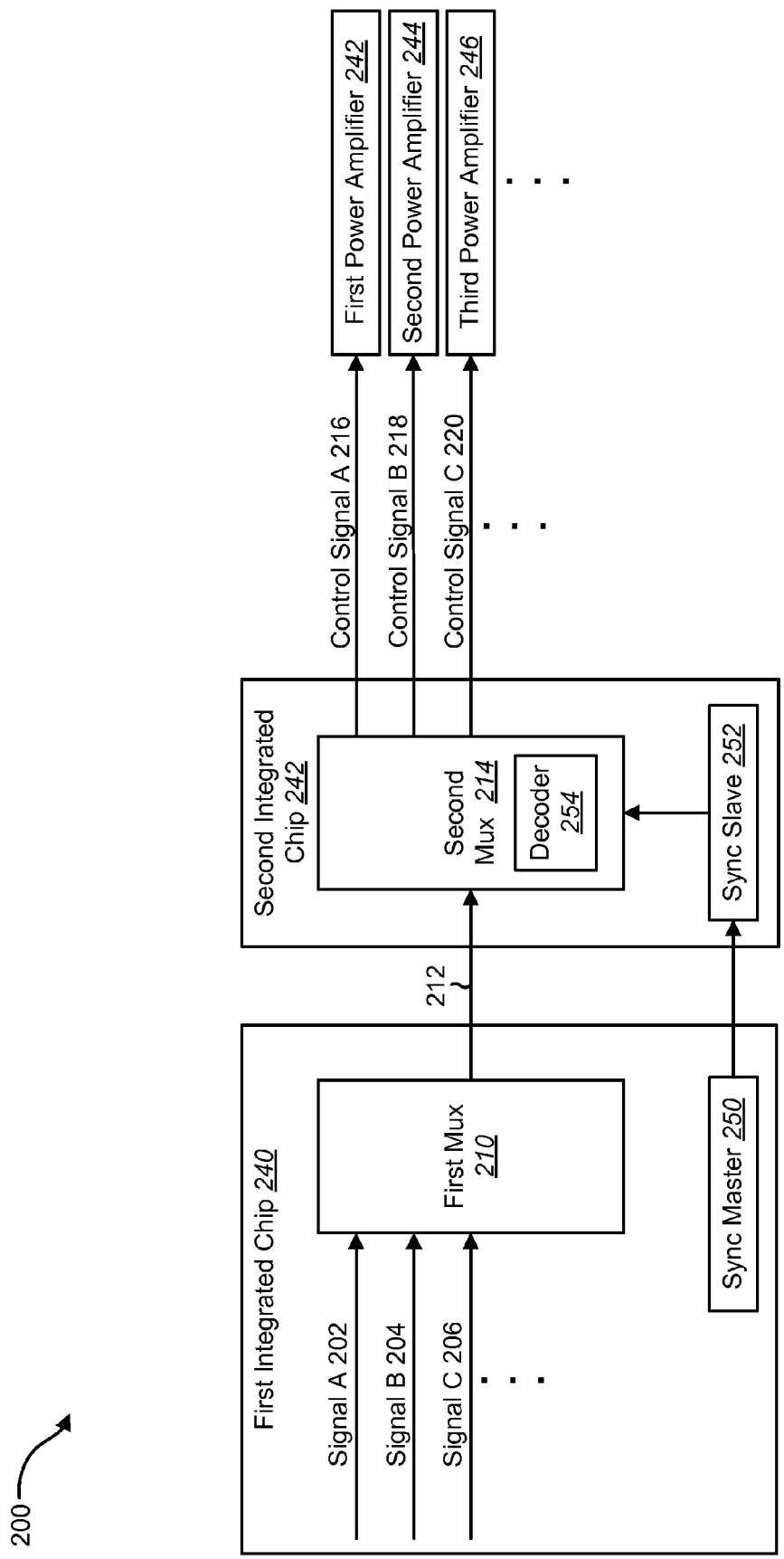
FIG. 2 is a block diagram illustrating one example of a first integrated circuit utilizing a second integrated circuit to produce control signals to control power amplifiers.

FIG. 2 is a block diagram illustrating one example of a first integrated circuit 240 utilizing a second integrated circuit 242 to produce control signals 216, 218, 220 to control power amplifiers 242, 244, 246. In one configuration, the first integrated circuit 240 is a modem system modem (MSM) digital integrated circuit (IC). The second integrated circuit 242 may be a power management IC (PMIC).

The first integrated circuit 240 may include a first multiplexer (MUX) 210. A MUX may be used to combine multiple analog message signals or digital data streams into one common node signal. A multiplexed signal 212 may be transmitted over a communication channel, which may be a physical transmission medium.

In one example, a plurality of signals 202, 204, 206 may be multiplexed by the first MUX 210. While three signals 202, 204, 206 are illustrated, more signals could be present. The multiplexed signal 212 may be transmitted to a second MUX 214 on the second IC 242. The second MUX 214 may include a decoder 254 that is used to decode the multiplexed signal 212. A plurality of control signals 216, 218, 220 may be produced from the second IC 242 via the second MUX 214. Each of the control signals 216, 218, 220 may control a power amplifier 242, 244, 246.

The first MUX 210 and the second MUX 214 may be synchronized. A sync master 250 on the first IC 240 may communicate with a sync slave 252 on the second IC 242. The sync master 250 may provide instructions to the sync slave 252 regarding the synchronization of the first MUX 210 and the second MUX 214. The sync slave 252 may communicate the synchronization instructions to the second MUX 214. The sync master 250 may use a single-wire serial bus interface (SSBI) to communicate with the sync slave 252. In other examples, the sync master 250 may use additional interfaces, wires, etc. to communicate with the sync slave 252.

Figure 3:
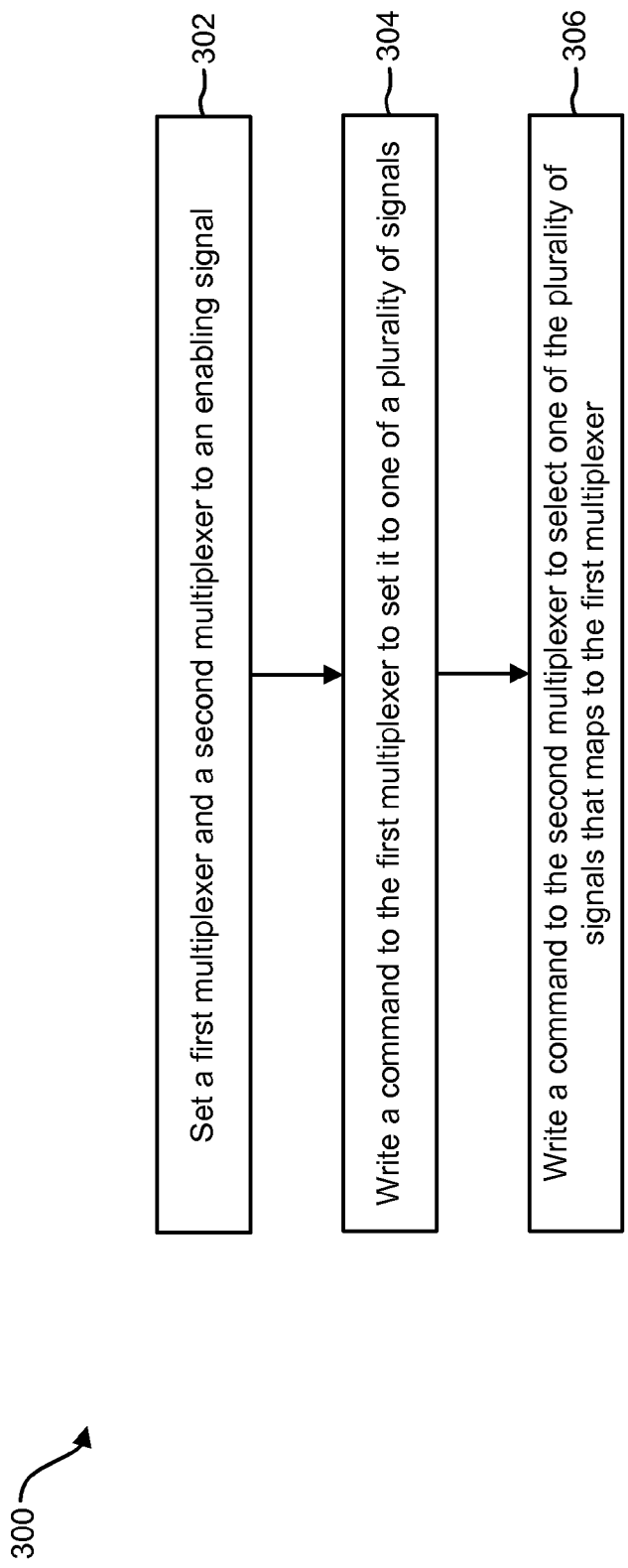
FIG. 3 is a flow diagram illustrating one example of a method for multiplexing control signals using an external integrated circuit (IC)

FIG. 3 is a flow diagram illustrating one example of a method 300 for multiplexing control signals using an external IC. The method 300 may be implemented by a mobile station 108. A first MUX and a second MUX may be set 302 to an enabling signal. The first MUX may be on the first integrated IC 240 and the second MUX may be on the second integrated IC 242. The second integrated IC 242 may be the external integrated IC.

In one configuration, a command may be written 304 to the first MUX. The command may instruct the first MUX to set itself to one of a plurality of control signals. An example of a control signal may include the plurality of signals 202, 204, 206 described in FIG. 2. Another command may be written 306 to the second MUX. The command may instruct the second MUX to select one of the plurality of control signals that maps to the first MUX on the first IC 240.

Figure 4:
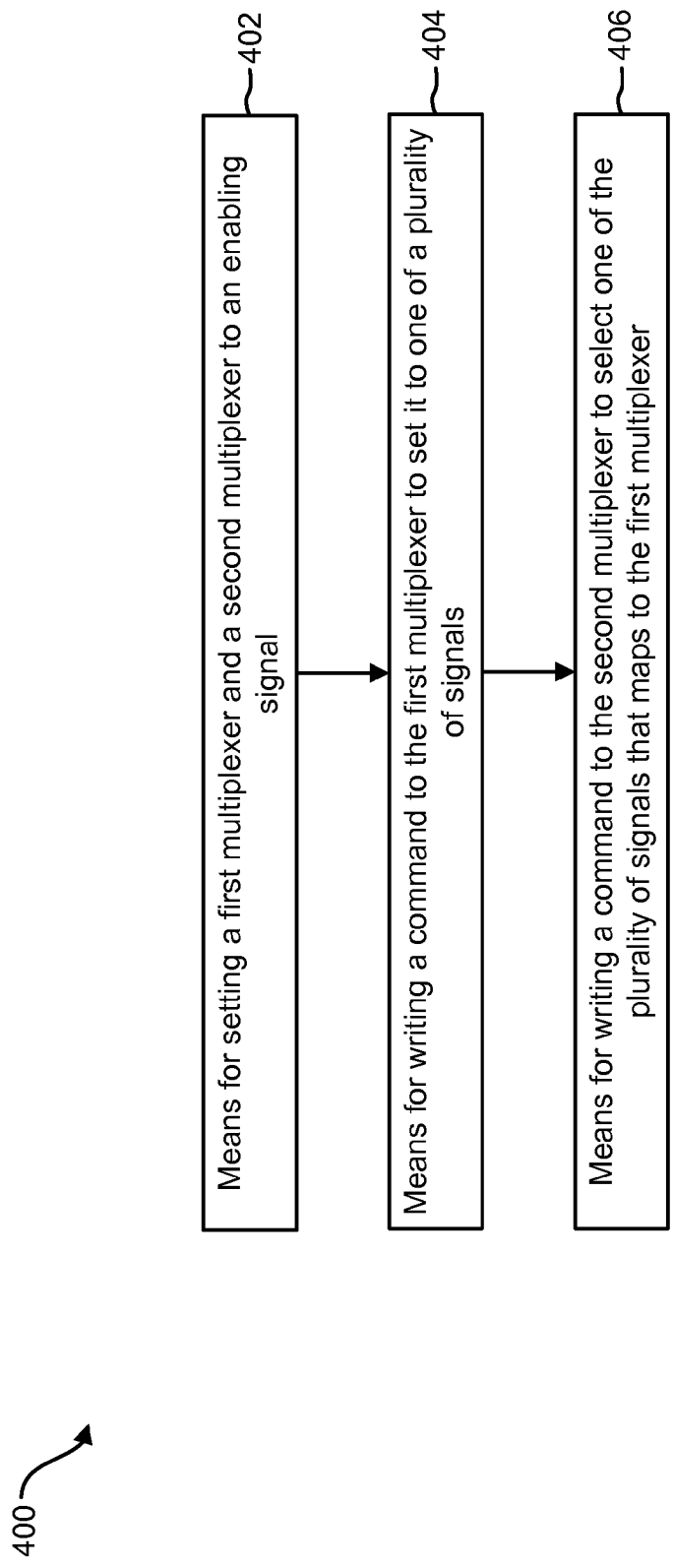
FIG. 4 illustrates means plus function blocks corresponding to the method shown in FIG. 3.

The method of FIG. 3 described above may be performed by various hardware and/or software component(s) and/or module(s) corresponding to the means-plus-function blocks illustrated in FIG. 4. In other words, blocks 302 through 306 illustrated in FIG. 3 correspond to means-plus-function blocks 402 through 406 illustrated in FIG. 4.

Figure 5:
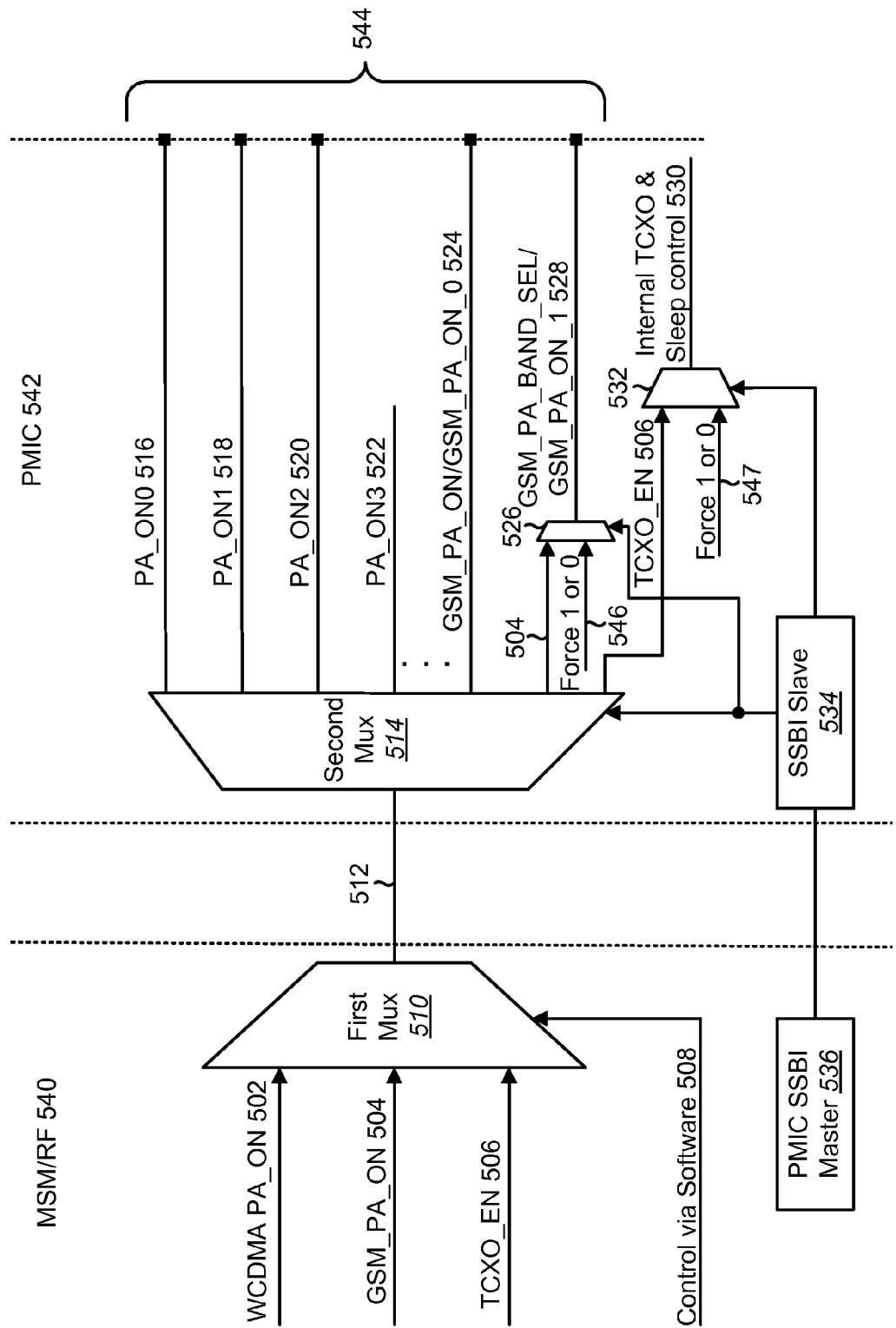
FIG. 5 is a block diagram illustrating one configuration of a modem system modem (MSM)/Radio Frequency (RF) circuit and an external power management IC (PMIC)

FIG. 5 is a block diagram illustrating one configuration of an MSM/Radio Frequency (RF) circuit 540 and an external PMIC 542. The MSM/RF 540 and the PMIC 542 may be connected by a die-to-die connection between a first MUX 510 and a second MUX 514. A single wire 512 may be used to connect the first MUX 510 and the second MUX 514. In one example, the PMIC 542 is also connected to a battery supply (not shown). Because the PMIC 542 is connected directly to a battery, the PMIC 542 may be capable of handling more than 4 or 5 volts.

The first MUX 510 may multiplex one or more control signals for one or more power amplifiers. An example of a control signal may include a power amplifier on/off signal (PA_ON signal). The first MUX 510 may multiplex PA_ON signals used in Wideband CDMA systems (WCDMA), such as a WCDMA PA_ON signal 502, and/or PA_ON signals used in Global System for Mobile communication (GSM) systems, such as GSM_PA_ON signals 504. The PA_ON signals 502, 504 may be multiplexed onto the signal wire 512.

In another configuration, an enable signal may also be multiplexed by the first MUX 510. An example of the enable signal may include a temperature compensated crystal oscillator (TCXO) enable signal 506. The TCXO_EN signal 506 may originate at the MSM 540 and go to the PMIC 542. In one example, the TCXO is an electronic circuit that uses the mechanical resonance of a vibrating crystal of piezoelectric material to create an electric signal with a precise frequency. The frequency may be used to provide a stable clock signal for digital ICs, such as the MSM/RF 540 and the PMIC 542. In one example, the die-to-die connection between the first MUX 510 and the second MUX 514 may be utilized as the single wire 512 that is common for the TXCO_EN signal 506 and for the PA_ON signals 502, 504 to transmit these signals 502, 504, 506 from the MSM 540 to the PMIC 542.

In one aspect, the second MUX 514 may output one or more separate WCDMA PA_ON control signals 516, 518, 520, 522 that may be used to control individual power amplifiers (not shown) in a WCDMA system. The second MUX 514 may also output one or more GSM PA_ON control signals 524, 528 that may be used to control the power amplifiers in a GSM system. In one configuration, the PA_ON control pins 544 may include voltage settings of 1.8V, 2.6V or 2.85V.

The first MUX 510 and the second MUX 514 may be synchronized by control via software 508 connected to the first MUX 510. In addition, a PMIC single-wire serial bus interface (SSBI) master 536 may be included on the MSM/RF 540. The PMIC SSBI master 536 may communicate with an SSBI slave 534 on the PMIC 542 in order to synchronize the second MUX 514. For example, the GSM_PA_ON signal 504 may be synchronized with the GSM PA_ON_0 signal 524 in the PMIC 542. When the connection by the single wire 512 between the MSM/RF 540 and the PMIC 542 is established, the GSM_PA_ON signal 504 may be toggled and the GSM PA_ON_0 signal 524 will also toggle. A delay may exist. The delay may also be compensated.

In one example, a hard hand over may be executed. A hard hand over may indicate that a GSM low band is currently implemented and a hand over to a GSM high band is going to occur. The first MUX 510 and the second MUX 514 are re-synched when the hand over from the GSM low band to the GSM high band occurs. In one configuration, an SBI command and software control are utilized in order to re-synch the first MUX 510 and the second MUX 514.

The PMIC 542 may also include a third MUX 526 which may be utilized to force a signal high when desired. For example, a power amplifier in a GSM system may have two bits to control for two bands. One of the bits may be high or low, which may determine the band. The other bit may be used to turn the power amplifier on and off. For example, a zero (0) (or low) may be used for the low band and a one (1) (or high) may be for the high band in the band select of the power amplifier. If a transmission in the high band is to occur, the GSM_PA_BAND_SELECT may be one (1) and the PA_ON signal may also be high. However, the second MUX 514 may provide a one (1) on any one of the wires. As such, a conflict may occur if two ones are desired to be produced from the second MUX 514. In one configuration, the third MUX 526 may force the GSM_PA_BAND_SEL/GSM_PA_ON_1 signal 528 to a one (1) (or high) under such circumstances using a first force one (1) or zero (0) signal 546. The GSM_PA_ON signal 504 may also be applied to the third MUX 526. The third MUX 526 may be controlled via the SSBI slave 534.

The PMIC 542 may also include a fourth MUX 532. The fourth MUX 532 may multiplex the TCXO_EN signal 506 and a second force one (1) or zero (0) signal 547. The fourth MUX 532 may produce an internal TCXO and sleep control signal 530. The sleep control signal 530 may instruct the PMIC 542 to enter a sleep mode.

Figure 6:
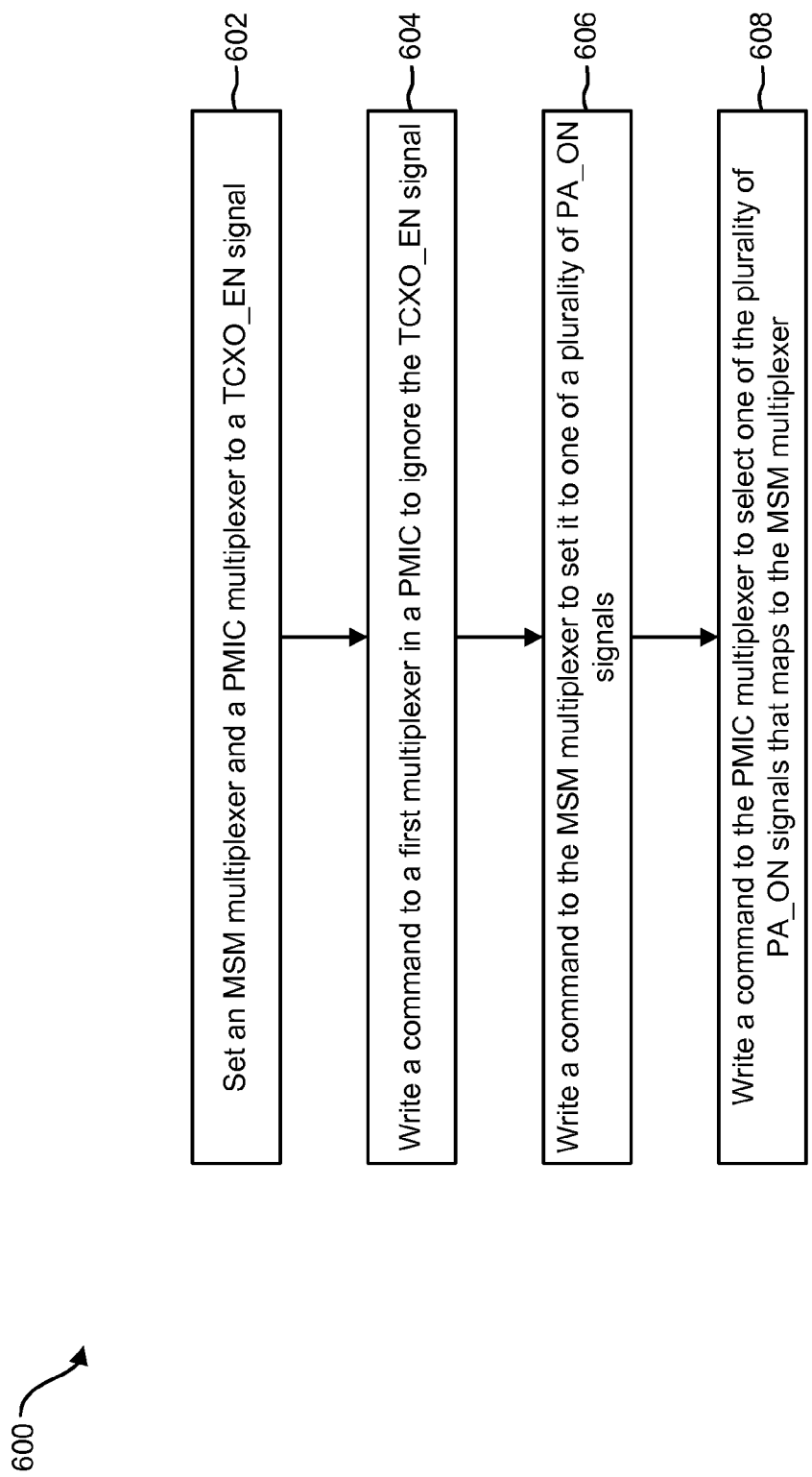
FIG. 6 is a flow diagram illustrating one configuration of a method for providing control signals for power amplifiers via an external IC.

FIG. 6 is a flow diagram illustrating one configuration of a method 600 for providing control signals for power amplifiers via an external IC. The method 600 may be implemented by a mobile station 108. In one example, an MSM multiplexer and a PMIC multiplexer may be set 602 to an enabling signal. The MSM multiplexer may be the first MUX 210 and the PMIC multiplexer may be the second MUX 214. The enabling signal may be the TCXO_EN signal 506.

In one example, a command may be written 604 to a first multiplexer in the PMIC 542 to ignore the enabling signal. The first multiplexer may be the third MUX 526 previously described. In addition, a command may be written 606 to the MSM MUX. The command may instruct the MSM MUX to set itself to one of a plurality of PA_ON signals. The plurality of PA_ON signals may include the WCDMA PA_ON signal 502 or the GSM_PA_ON signal 504. A command may be written 608 to the PMIC MUX. The command may instruct the PMIC MUX to select one of the plurality of PA_ON signals that maps to the MSM MUX. In other words, the PMIC MUX is set to the same PA_ON signal as the MSM MUX.

Figure 7:
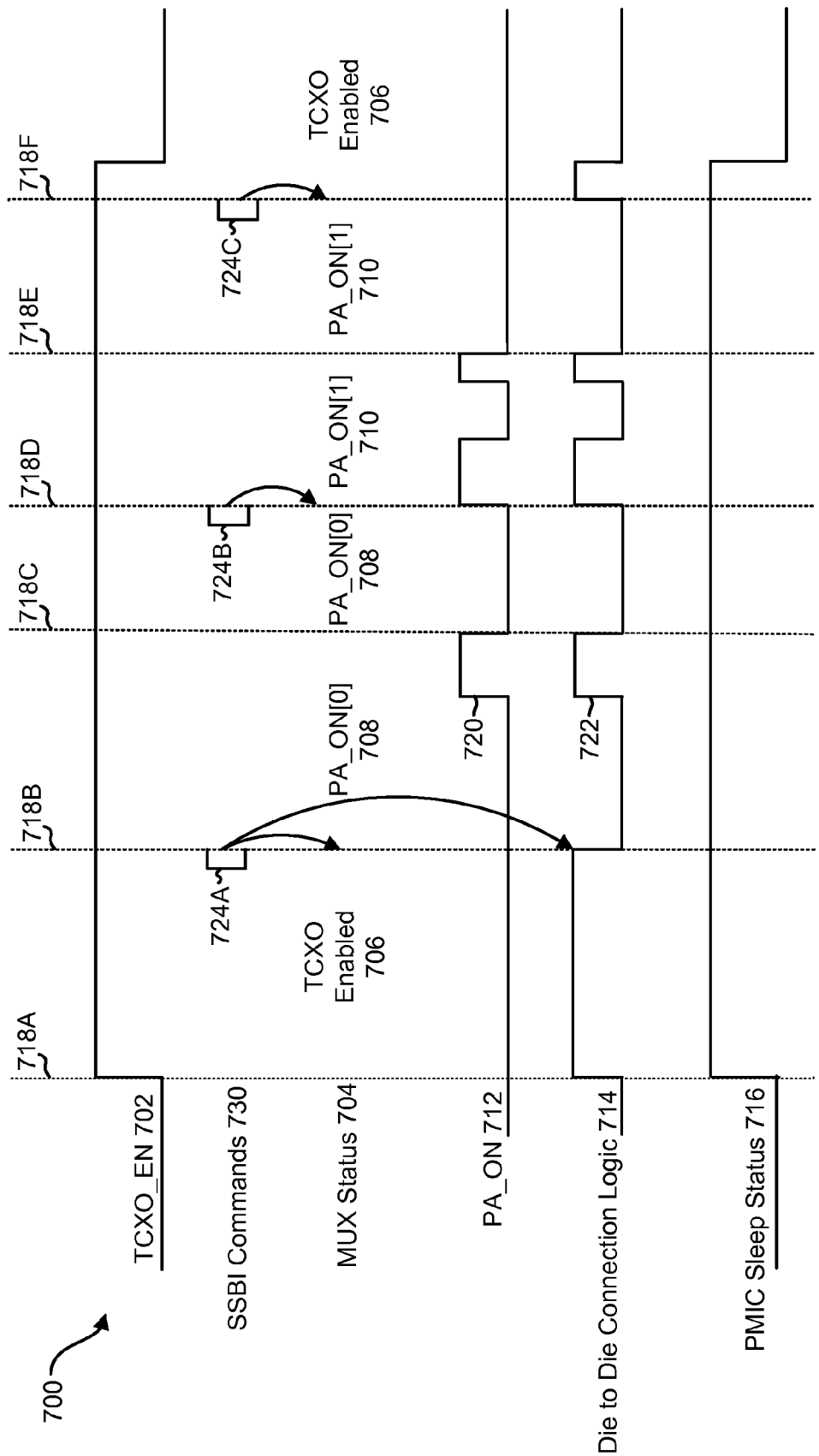
FIG. 7 is a timing diagram illustrating various logic states of one or more control signals.

FIG. 7 is a timing diagram 700 illustrating various logic states of one or more control signals. The timing diagram 700 includes the TCXO_EN signal 702 and the PA_ON signal 712. The PA_ON signal 712 may be either a GSM_PA_ON signal or a WCDMA PA_ON signal. The diagram 700 further illustrates the logic state of a die-to-die connection 714 between the MSM 540 and the PMIC 542. The diagram 700 also illustrates the status of the first MUX 510 on the MSM 540 and the second MUX 514 on the PMIC 542. A PMIC sleep status 716 is also illustrated on the diagram 700.

In one example, at a first time period 718A, the TCXO_EN signal 702 goes high. A high TCXO_EN signal 702 indicates the PMIC 542 is activated, as indicated by the PMIC sleep status 716 also going high. The first MUX 510 on the MSM 540 and the second MUX 514 on the PMIC 542 may be set to the TCXO_EN signal 702. The MUX status 704 indicates that both the first MUX 510 on the MSM 540 and the second MUX 514 on the PMIC 542 are in a TCXO enabled status 706. In addition, at the first time period 718A, the die-to-die connection logic 714 also goes high. In other words, when the TCXO_EN signal 702 goes high, a die-to-die connection between the MSM 540 and the PMIC 542 is established.

One or more SSBI commands 730 may also be sent from the MSM 540 to the PMIC 542. For example, a first SSBI command 724A may be sent from the MSM 540 to the PMIC 542 in order to change the configuration of the second MUX 514. The first SSBI command 724A may be sent before a second time period 718B begins. In one example, the first SSBI command 724A is written to the fourth MUX 532 that had been receiving the TCXO_EN signal 506. The first SSBI command 724A may instruct the fourth MUX 532 to ignore the TXCO_EN signal 506. In addition, a command may be written to the first MUX 510 on the MSM 540 instructing the first MUX 510 to set itself to any of the PA_ON signals (i.e., the WCDMA PA_ON signal 502, the GSM_PA_ON signal 504, etc.) Instructing the first MUX 510 to set itself to any of the PA_ON signals may avoid a false high on any of the PA_ON signals 516, 518, 520, 522, etc. on the PMIC 542. Further, a command may be written to the second MUX 514 on the PMIC 542 to select the PA_ON signal that maps to the first MUX 510 on the MSM 540. In one configuration, the die-to-die connection between the first MUX 510 and the second MUX 514 is free for any PA_ON signal from the MSM 540.

The commands 730 sent to the PMIC 542 may be sent after the PMIC 542 has warmed up, indicated by the PMIC sleep status 716 at the first time period 718A. In one example, the time for the PMIC 542 to warm up may be greater than 3.5 milliseconds. In one configuration, the commands may also be sent to the PMIC 542 at least 500 microseconds before a transmission occurs.

The logic state of a PA_ON signal 712 may go high 720 anytime following the commands that are sent at the second time period 718B. The PA_ON signal may be PA_ON0 516, PA_ON1 518, PA_ON2 520, etc. For example, the PA_ON signal may be the PA_ON0 signal 516. As such, the MUX status 704 may be PA_ON[0] 708 between the second time period 718B and a third time period 718C. Alternatively, the PA_ON signal 712 may be the GSM_PA_ON/GSM_PA_ON_0 524, the GSM_PA_BAND_SEL 528, etc. The die-to-die connection logic 714 may also go high 722 in order to follow the logic state of the PA_ON signal 712.

A second SSBI command 724B may be written to the second MUX 514 on the PMIC 542 to change the MUX status 704 from PA_ON[0] 708 to PA_ON[1] 710. This second SSBI command 724B may be written between the third time period 718C and a fourth time period 718D. The command may be written after the PA_ON0 signal 506 goes low, as indicated by the logic state of the PA_ON 712. At the beginning of the fourth time period 718D, the PA_ON1 518 signal goes high. As such, the MUX status 704 may indicate PA_ON[1] 710. As shown, the die-to-die connection logic 714 also goes high and low to follow the logic state of the PA_ON 712.

A third SSBI command 724C may also be written to the PMIC 542 to change the configuration of the second MUX 514 from any PA_ON state (such as PA_ON[1] 710) to the TCXO_EN state 706. The TCXO block of the PMIC 542 may revert from SSBI control to pin control. The die-to-die connection logic 714 may go high following the TCXO_EN state 706 from the MSM 540. The TCXO_EN state 706 may begin after transmission has completed and when the mobile station 108 is ready to enter the sleep mode. The mobile station 108 may no longer need to respond to PA_ON signal states. In one configuration, the transition time between PA_ON states (e.g., PA_ON[0] 708 and PA_ON[1] 710) may be in the order of 100 milliseconds. Transitioning between PA_ON states may be caused by hard handoffs between nodes and bands. In one example, the TCXO_EN state 702 goes low after a sixth time period 718F. The die-to-die connection may send a signal to the PMIC 542 for the PMIC to enter a sleep mode.

Figure 8:
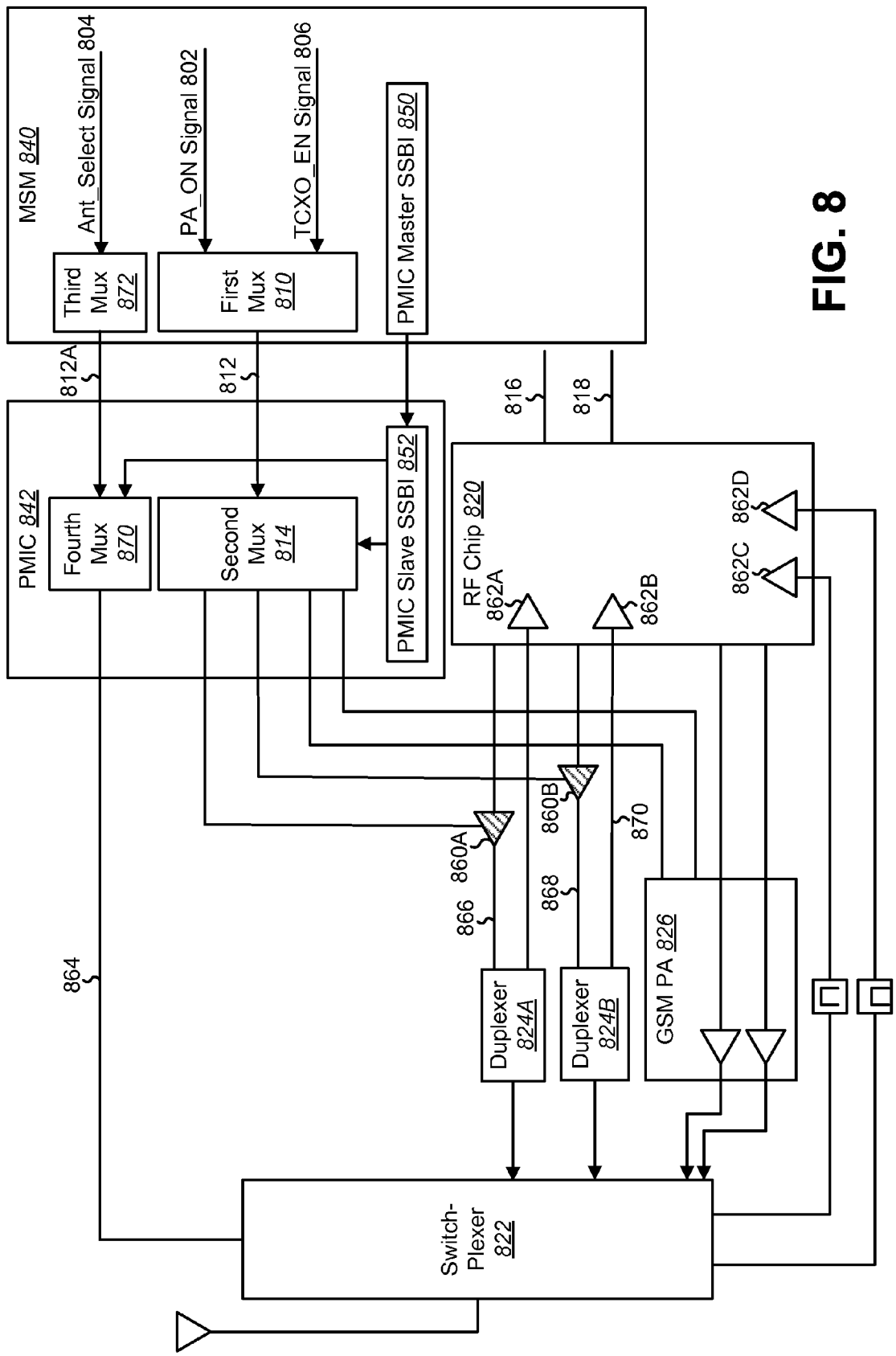
FIG. 8 is a block diagram illustrating one further example of the MSM and an external IC.

FIG. 8 is a block diagram illustrating one further example of the MSM 840 and an external IC, such as the PMIC 842. The MSM 840 may include a first MUX 810 and a third MUX 872. The PMIC may include a second MUX 814 and a fourth MUX 870. In one configuration, a control signal, such as a die-to-die connection 812, connects the first MUX 810 and the second MUX 814. In addition, a second control line 812A may connect the third MUX 872 and the fourth MUX 870. The second control line 812A may be a multi-bit register control line. In other words, the second control line 812A could be more than one wire. A PMIC master SSBI 850 communicates commands to a PMIC slave SSBI 852. The commands may synchronize the first MUX 810 and the second MUX 814 as well as the third MUX 872 and the fourth MUX 870.

The first MUX 810 may multiplex one or more signals. For example, the first MUX 810 may multiplex a PA_ON signal 802 and a TCXO_EN signal 806. The third MUX 872 may multiplex an antenna select (Ant_Select) signal 804 and other additional control signals (not shown). The antenna select signal 804 may be utilized to control a switch-plexer 822. The first MUX 810 may also multiplex other control signals not shown, such as power amplifier range (PA_R) signals. PA_R signals may determine the gain for the power amplifiers (i.e., high gain, low gain, etc.)

In one configuration, the fourth MUX 870 provides an output. One example of an output are four antenna lines 864 that are connected to the switch-plexer 822. The four antenna lines 864 may be controlled by the Ant_Select signal 804. The second MUX 814 may provide a plurality of outputs. Outputs of the second MUX 814 may be connected to WCDMA PAs

860A, 860B. The second MUX 814 may also be connected to a GSM PA 826. If the PA_ON signal 802 is a GSM PA_ON signal, as previously described, the GSM PA_ON signals may control the GSM PA 826.

In addition, an RF chip 820 may connect to one or more power amplifiers 860A, 860B that are controlled by the PA_ON signal 802. A first transmission line 866 and a second transmission line 868 may connect the WCDMA PAs 860A, 860B to duplexers 824A, 824B. A third transmission line 870 may be used to connect the RF chip 820 to the duplexers 824A, 824B. In one configuration, the RF chip 820 includes low-noise amplifiers (LNA) 862A, 862B, 862C, 862D. Further, the RF chip 820 may be connected to the MSM 840 via an I/Q transmission line 816 and an I/Q receiving line 818.

Figure 9:
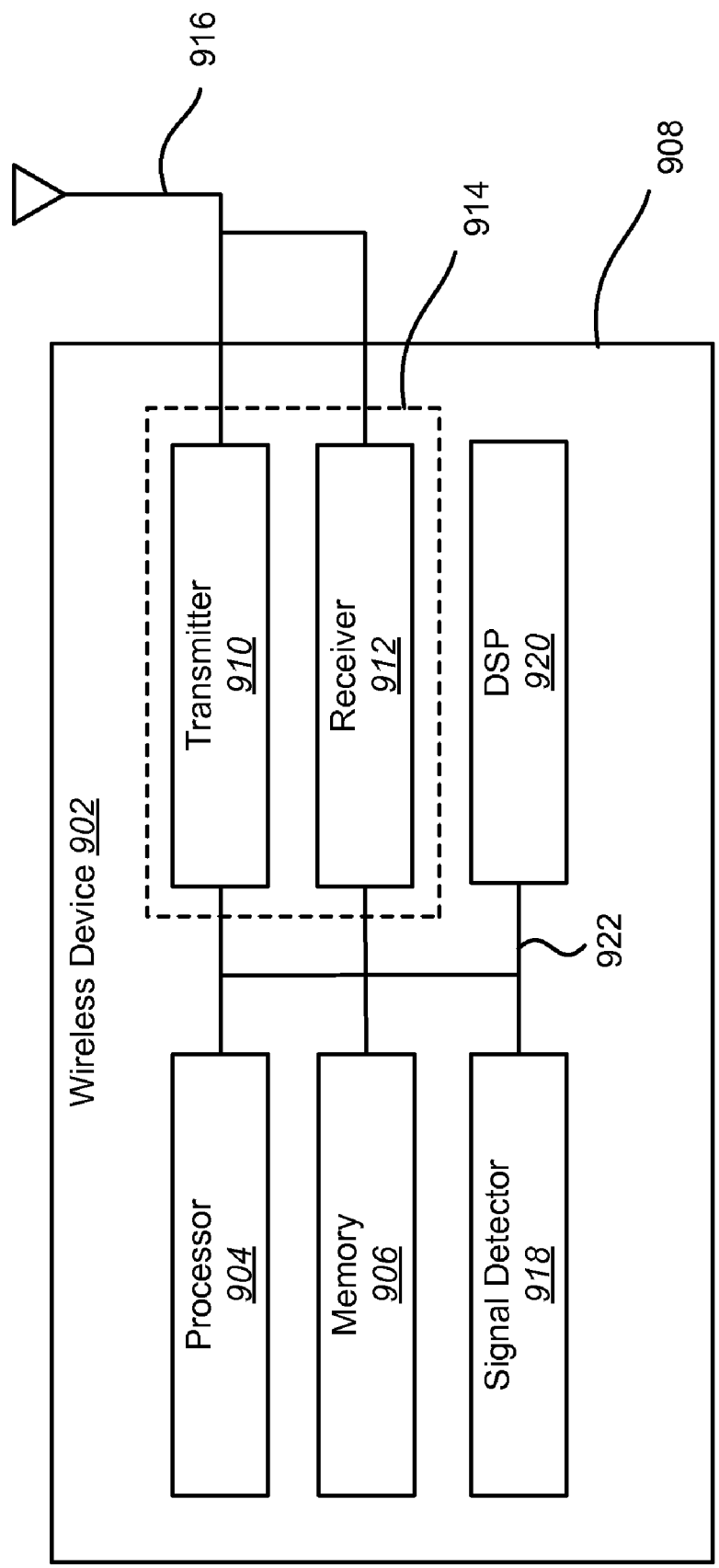
FIG. 9 illustrates various components that may be utilized in a wireless communication device.

FIG. 9 illustrates various components that may be utilized in a wireless device 902. The wireless device 902 is an example of a device that may be configured to implement the various methods described herein. The wireless device 902 may be a base station 110 or a mobile station 108.

The wireless device 902 may include a processor 904 which controls operation of the wireless device 902. The processor 904 may also be referred to as a central processing unit (CPU). Memory 906, which may include both read-only memory (ROM) and random access memory (RAM), provides instructions and data to the processor 904. A portion of the memory 906 may also include non-volatile random access memory (NVRAM). The processor 904 typically performs logical and arithmetic operations based on program instructions stored within the memory 906. The instructions in the memory 906 may be executable to implement the methods described herein.

The wireless device 902 may also include a housing 908 that may include a transmitter 910 and a receiver 912 to allow transmission and reception of data between the wireless device 902 and a remote location. The transmitter 910 and receiver 912 may be combined into a transceiver 914. An antenna 916 may be attached to the housing 908 and electrically coupled to the transceiver 914. The wireless device 902 may also include (not shown) multiple transmitters, multiple receivers, multiple transceivers and/or multiple antenna.

The wireless device 902 may also include a signal detector 918 that may be used to detect and quantify the level of signals received by the transceiver 914. The signal detector 918 may detect such signals as total energy, pilot energy per pseudonoise (PN) chips, power spectral density, and other signals. The wireless device 902 may also include a digital signal processor (DSP) 920 for use in processing signals.

The various components of the wireless device 902 may be coupled together by a bus system 922 which may include a power bus, a control signal bus, and a status signal bus in addition to a data bus. However, for the sake of clarity, the various busses are illustrated in FIG. 9 as the bus system 922.

As used herein, the term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device, discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core or any other such configuration.

The steps of a method or algorithm described in connection with the present disclosure may be embodied directly in hardware, in a software module executed by a processor or in a combination of the two. A software module may reside in any form of storage medium that is known in the art. Some examples of storage media that may be used include RAM memory, flash memory, ROM memory, EPROM memory, EEPROM memory, registers, a hard disk, a removable disk, a CD-ROM and so forth. A software module may comprise a single instruction, or many instructions, and may be distributed over several different code segments, among different programs and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in software, the functions may be stored as one or more instructions on a computer-readable medium. A computer-readable medium may be any available medium that can be accessed by a computer. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. Combinations of the above should also be included within the scope of computer-readable media.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein, such as those illustrated by FIGS. 1-9, can be downloaded and/or otherwise obtained by a mobile device and/or base station as applicable. For example, such a device can be coupled to a server to facilitate the transfer of means for performing the methods described herein. Alternatively, various methods described herein can be provided via a storage means (e.g., random access memory (RAM), read only memory (ROM), a physical storage medium such as a compact disc (CD) or floppy disk, etc.), such that a mobile device and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for controlling the voltage of signals used to control power amplifiers, comprising:
    setting a first multiplexer and a second multiplexer to an enabling signal, wherein the first multiplexer is on a first integrated circuit and the second multiplexer is on a second integrated circuit;
    writing a command to the first multiplexer to set the first multiplexer to one of a plurality of control signals used to control a power amplifier; and
    writing a command to the second multiplexer to select one of the plurality of control signals that maps to the first multiplexer, wherein the second integrated circuit is connected to a power supply.

2. The method of claim 1, wherein the enabling signal is a temperature compensated crystal oscillator (TCXO) enabling signal.

3. The method of claim 1, wherein the commands are written to the first multiplexer using control software.

4. The method of claim 1, wherein the commands are written to the second multiplexer using a single-wire serial bus interface (SSBI).

5. The method of claim 1, wherein the first integrated circuit is a digital modem system modem (MSM) integrated circuit.

6. The method of claim 1, wherein the second integrated circuit is a power management integrated circuit (PMIC).

7. The method of claim 1, wherein the control signals are power amplifier on (PA_ON) signals.

8. The method of claim 7, further comprising multiplexing the TCXO enabling signal and the PA_ON signals.

9. The method of claim 7, wherein the PA_ON signals control power amplifiers in a Wideband Code Division Multiple Access (WCDMA) system.

10. The method of claim 7, wherein the PA_ON signals control power amplifiers in a Global System for Mobile (GSM) communications system.

11. The method of claim 1, wherein the control signals are a plurality of antenna select signals used to control a switch.

12. The method of claim 1, further comprising writing a command to the second multiplexer to ignore the enabling signal.

13. The method of claim 1, connecting the first multiplexer and the second multiplexer using a single die-to-die connection.

14. A wireless device for controlling the voltage of signals used to control power amplifiers, comprising:
    a processor;
    memory in electronic communication with the processor;
    instructions stored in the memory, the instructions being executable to:
        set a first multiplexer and a second multiplexer to an enabling signal, wherein the first multiplexer is on a first integrated circuit and the second multiplexer is on a second integrated circuit;
        write a command to the first multiplexer to set the first multiplexer to one of a plurality of control signals used to control a power amplifier; and
        write a command to the second multiplexer to select one of the plurality of control signals that maps to the first multiplexer, wherein the second integrated circuit is connected to a power supply.

15. The wireless device of claim 14, wherein the wireless device is a handset.

16. The wireless device of claim 14, wherein the wireless device is a base station.

17. The wireless device of claim 14, wherein the enabling signal is a temperature compensated crystal oscillator (TCXO) enabling signal.

18. The wireless device of claim 14, wherein the commands are written to the first multiplexer using control software.

19. The wireless device of claim 14, wherein the commands are written to the second multiplexer using a single-wire serial bus interface (SSBI).

20. The wireless device of claim 14, wherein the first integrated circuit is a digital modem system modem (MSM) integrated circuit.

21. The wireless device of claim 14, wherein the second integrated circuit is a power management integrated circuit (PMIC).

22. The wireless device of claim 14, wherein the control signals are power amplifier on (PA_ON) signals.

23. The wireless device of claim 22, wherein the instructions are further executable to multiplex the TCXO enabling signal and the PA_ON signals.

24. The wireless device of claim 22, wherein the PA_ON signals control power amplifiers in a Wideband Code Division Multiple Access (WCDMA) system.

25. The wireless device of claim 22, wherein the PA_ON signals control power amplifiers in a Global System for Mobile (GSM) communications system.

26. An apparatus for controlling the voltage of signals used to control power amplifiers, comprising:
    means for setting a first multiplexer and a second multiplexer to an enabling signal, wherein the first multiplexer is on a first integrated circuit and the second multiplexer is on a second integrated circuit;
    means for writing a command to the first multiplexer to set the first multiplexer to one of a plurality of control signals used to control a power amplifier; and
    means for writing a command to the second multiplexer to select one of the plurality of control signals that maps to the first multiplexer, wherein the second integrated circuit is connected to a power supply.

27. The apparatus of claim 26, wherein the enabling signal is a temperature compensated crystal oscillator (TCXO) enabling signal.

28. The apparatus of claim 26, wherein the commands are written to the first multiplexer using control software.

29. The apparatus of claim 26, wherein the commands are written to the second multiplexer using a single-wire serial bus interface (SSBI).

30. The apparatus of claim 26, wherein the first integrated circuit is a digital modem system modem (MSM) integrated circuit.

31. The apparatus of claim 26, wherein the second integrated circuit is a power management integrated circuit (PMIC).

32. A computer-program product for controlling the voltage of signals used to control power amplifiers, the computer-program product comprising a computer readable medium having instructions thereon, the instructions comprising:

code for setting a first multiplexer and a second multiplexer to an enabling signal, wherein the first multiplexer is on a first integrated circuit and the second multiplexer is on a second integrated circuit;

code for writing a command to the first multiplexer to set the first multiplexer to one of a plurality of control signals used to control a power amplifier; and code for writing a command to the second multiplexer to select one of the plurality of control signals that maps to the first multiplexer, wherein the second integrated circuit is connected to a power supply.

33. A circuit for controlling the voltage of signals used to control power amplifiers, the circuit comprising:

a first integrated circuit and a second integrated circuit, wherein the first integrated circuit is a modem system modem (MSM) circuit, the second integrated circuit is a power management integrated circuit (PMIC) and the second integrated circuit is connected to a power supply;

a first multiplexer on the MSM and a second multiplexer on the PMIC, wherein the first multiplexer and the second multiplexer are set to an enabling signal, and wherein a command is written to the first multiplexer to set the first multiplexer to one of a plurality of control signals used to control a power amplifier; and a single-wire serial bus interface (SSBI), wherein the SSBI writes a command to the second multiplexer to select one of the plurality of control signals that maps to the first multiplexer.

\* \* \* \* \*